United States Patent Office 2,924,591
Patented Feb. 9, 1960

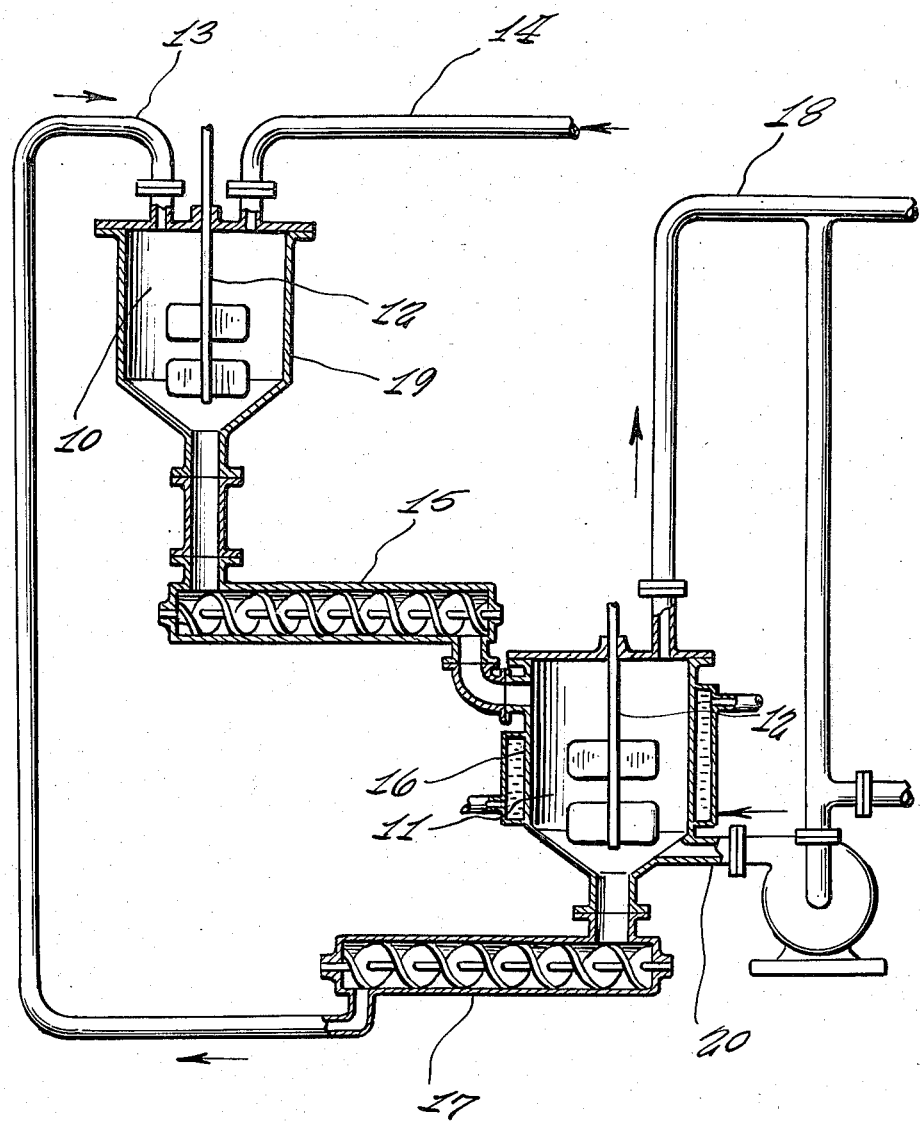

2,924,591

PROCESS FOR THE PRODUCTION OF HIGH MOLECULAR WEIGHT ETHYLENE POLYMERS

Otto Roelen, Oberhausen-Holten, Germany, assignor to Ruhrchemie Aktiengesellschaft, Oberhausen-Holten, Germany Application October 26, 1955, Serial No. 542,988

Claims priority application Germany October 27, 1954

3 Claims. (Cl. 260—94.9)

The present invention is a process for the production of high molecular weight ethylene polymers and is a further development of my co-pending application Ser. No. 516,745, filed June 20, 1955.

There, it has already been suggested to produce high molecular weight ethylene polymers having molecular weights in excess of 100,000 from ethylene or ethylene-containing gases by means of polymerization stimulants and at gas pressures of below 200 kg./sq. cm.; in this process the polymerization of ethylene is to be effected at temperatures ranging below the caking or sintering temperature of the polymerized products. The process is carried out in such a manner that the polymerization is effected within a mixture consisting of solid or liquid polymerization catalysts and reaction products, which is in powder form or in granular state and is continuously mechanically subdivided and/or agitated in such a manner that all parts of the mixture react with the ethylene constantly and with as little obstruction as possible. In this process, a number of specific measures and devices are used which have proved to be convenient and advantageous in carrying out this particular mode of operation.

The operability of the polymerization according to the process mentioned above is dependent upon the fact that the reaction temperatures are maintained below a range at which the reaction products will cake or sinter. This was relatively easy to achieve with the very high melting polyethylenes having molecular weights in excess of 100,000. It has now surprisingly been found that an undisturbed polymerization in the dry phase in the manner of the process mentioned above is also possible when producing polyethylenes having molecular weights below 100,000, for example, molecular weights of 30,000 to 50,000.

The principles of the process are similar to those described in the above mentioned application Ser. No. 516,745. Thus, the process for the production of ethylene polymers from ethylene or ethylene-containing gases is carried out by means of polymerization catalysts and at gas pressures below 200 kg./sq. cm. with the polymerization of the ethylene being effected at temperatures ranging below the caking or sintering temperatures of the polymerized products within a mixture of solid or liquid polymerization catalysts and reaction products, which is in powder form or granular state and is continuously mechanically subdivided and/or agitated in such a manner that all parts of the mixture react with the ethylene constantly and with as little obstruction as possible; the ethylene polymers produced have molecular weights of less than 100,000.

The process is, of course, not applicable to the production of ethylene polymers which, at the reaction temperatures involved, are present in liquid or salve-like form. As a consequence, molecular weights of about 10,000–100,000 are the preferred range for applying the process.

The process may be operated in various manners as has already been described in the process mentioned above. It was found, moreover, that, as was to be expected, the conditions for the removal of the heat of reaction must be observed more carefully in the production of the lower molecular weight polymers, having molecular weights below 100,000, than with the higher molecular weight polymers, since products having lower melting points and increased tendencies for caking and sintering are formed. A particularly advantageous measure to control the space-time conversion and to avoid a higher conversion than corresponds to the conditions of heat removal, has been found to be the adjustment by means of the polymerization catalysts added. In doing so, ethylene may be offered in excess without encountering local overheating. Moreover, it is very advantageous to distribute the polymerization catalysts as uniformly as possible within the mixture.

The polymerization is preferably so conducted for obtaining products of low molecular weight that the polymerization stimulants are introduced in a higher amount than in the polymerization leading to polyethylene with molecular weights above 100,000. In operating according to the invention, a titanium halogen compound, preferably titanium tetrachloride, is used in the ratio of 1 mol per 1 mol or less of an aluminum alkyl compound. This is in contradistinction to the process for preparing polyethylene of molecular weight above 100,000, in which per mol titanium tetrachloride, 5 to 10 moles of an aluminum alkyl compound are used.

The preferred amount of polymerization catalysts is from 0.2 to 0.3 gram, with a charge of 15 to 20 liters of ethylene per hour. It should be noted that the molecular weight of the polymerization product is dependent on the amount of catalyst, the general rule being that higher amounts of catalyst yield lower molecular products, and vice versa.

When the process according to the invention is carried into practice, ethylene should always be present in excess and new amounts of catalyst should be added at once when the yield in polymer is observed to decrease.

The invention will now be more fully described in the following example, reference being had to the accompanying drawing, in which one embodiment of a device for carrying out the process is given by way of illustration; it should, however, be understood that many changes in the details can be made without departing from the spirit of the invention.

*Example*

The equipment used comprises a mixing vessel 10 and a reactor 11, both having a diameter of 18 centimeters and a length of 30 centimeters and both equipped with a stirrer 12. In the mixing vessel 10, batches of 900–1000 grams each of polyethylene powder (returned from the production) are supplied through a pipe 13 and carefully mixed with 200 cc. of catalyst solution supplied through line 14. Mixing is carried out under a nitrogen atmosphere and at room temperature. The catalyst solution is prepared by mixing 10.4 grams of aluminum diethyl monochloride and 16.4 grams of titanium tetrachloride in hydrogenated diesel oil with the exclusion of air and making the solution up with the diesel oil to 200 cc. The mixture of catalyst solution and polyethylene powder represents an externally dry, fine powder.

This powder is passed by means of a screw conveyor 15 in small quantities to the reactor 11, the temperature of which is maintained at 60° C. by means of a jacket 16, filled with oil. The quantity of reacting pulverulent mixture present in the reactor is maintained at about 1000–1500 grams by discharging from time to time, by means of a second screw conveyor 17, the excess resulting from the new formation of polymer.

The supply of the catalyst-containing polyethylene powder from the mixing vessel 10 into the reactor 11 is adjusted to 0.2+0.3 gram/hr. of catalyst substances (aluminum diethyl monochloride-titanium tetrachloride). At the same time, highly purified ethylene having an oxygen content of below 0.02% (as determined by means of phenyl isopropyl potassium) was continuously passed from below into the reactor at normal pressure. Unconverted ethylene leaves the reactor by an outlet line 18.

Under these conditions, 15-20 liters/hr. of ethylene are continuously blown off from the top of the reactor through line 18 so that roughly 90% of the ethylene charged were converted. The yield was 50 to 100 grams of polyethylene per gram of catalyst substance introduced.

The polyethylene discharged is in the form of a fine powder as indicated by the following screen analysis of a sample which had previously been washed with ethanol:

|  | Percent |
|---|---|
| 0.15 mm. | 24.0 |
| 0.075 mm. | 25.0 |
| 0.06 mm. | 8.6 |
| More than 0.06 mm. | 42.4 |
|  | 100.0 |

The ash content ranges between 0.37% and 0.42%, the melting point between 130° C. and 139° C.

The molecular weight was determined to be 38,000–45,000, the average being 40,000.

If, as described above, a steady supply of exactly controlled amounts of catalyst carefully distributed in the polyethylene powder is used, then the process can be operated undisturbed. If, however, larger amounts of catalyst are passed into the reactor in batches at a time, then temperature increases occur with an increased consumption of ethylene, while lumps and hard deposits form within the mixture, which finally result in destruction of the stirrer.

What I claim is:

1. A process for the production of ethylene polymers from ethylene-containing gases by means of polymerization catalysts at gas pressures below 200 kg./cm.$^2$, effecting the polymerization of ethylene in a dry phase and at temperatures ranging below the caking and sintering temperature of the polymers within a mixture of solid and liquid polymerization catalysts and reaction polymers, said polymers being in powder and granular form, being continually subdivided mechanically and being agitated in such a manner that all components of the mixture react with the ethylene constantly and with as little obstruction as possible, said process comprising the addition of titanium tetrachloride and an aluminum diethyl monochloride as said polymerization catalysts in a molar ratio of 1:1, whereby ethylene polymers are formed having molecular weights of 10,000 to 100,000.

2. A process according to claim 1, wherein a continuous operation of the process is carried out and the space-time conversion is controlled by means of the catalyst substances continuously introduced while an excess of ethylene is present.

3. A process according to claim 2, wherein the hourly addition of catalyst is 0.2–0.3 gram per 15–20 liters ethylene.

References Cited in the file of this patent

UNITED STATES PATENTS

| 2,721,189 | Anderson | Oct. 18, 1955 |
| 2,788,340 | Dannels | Apr. 9, 1957 |
| 2,822,357 | Brebner et al. | Feb. 4, 1958 |

FOREIGN PATENTS

| 584,794 | Great Britain | Jan. 27, 1947 |
| 533,362 | Belgium | May 16, 1955 |